United States Patent [19]

Buter

[11] 4,311,622

[45] Jan. 19, 1982

[54] THIXOTROPIC COATING COMPOSITION

[75] Inventor: Roelof Buter, Dieren, Netherlands

[73] Assignee: Akzo NV, Arnhem, Netherlands

[21] Appl. No.: 117,228

[22] Filed: Jan. 31, 1980

Related U.S. Application Data

[63] Continuation of Ser. No. 853,474, Nov. 21, 1977, abandoned.

[30] Foreign Application Priority Data

Nov. 25, 1976 [NL] Netherlands .......................... 7613121

[51] Int. Cl.$^3$ ................................................ C09D 5/04
[52] U.S. Cl. .................................. 260/18 EP; 106/218; 106/252; 260/22 R; 260/22 TN; 525/28; 525/128; 525/131; 525/440; 525/457; 525/528

[58] Field of Search ............... 525/128, 131, 440, 457, 525/528, 28; 260/18 EP, 22 R, 22 TN; 106/218, 252

[56] References Cited

U.S. PATENT DOCUMENTS

| | | | |
|---|---|---|---|
| 3,632,668 | 1/1972 | Kinney et al. | 526/6 |
| 3,822,226 | 7/1974 | Taft et al. | 525/131 |
| 3,893,956 | 7/1975 | Brandt | 525/440 |

*Primary Examiner*—Wilbert J. Briggs, Sr.
*Attorney, Agent, or Firm*—Stevens, Davis, Miller & Mosher

[57] ABSTRACT

A thixotropic coating composition is prepared from a binder and a sag control agent which is the reaction product of a diisocyanate and a monoamine or hydroxy monoamine having 1 to 5 aliphatic carbon atoms, the coating composition containing 0.1 to 30 percent by weight of the sag control agent.

10 Claims, No Drawings

THIXOTROPIC COATING COMPOSITION

This is a Continuation of application Ser. No. 853,474 filed Nov. 21, 1977, now abandoned.

The invention relates to a thixotropic coating composition prepared from a binder and a reaction product of diisocyanate and an amine as a sag control agent.

A coating composition of the type indicated above is known from the Belgian Pat. No. 808,466; in the preparation thereof the sag control agent used is the reaction product of a diisocyanate, more particularly for instance a symmetrical aliphatic or cycloaliphatic diisocyanate, and a primary or secondary polyamine.

The present invention provides a coating composition which is characterized in that the sag control agent is the reaction product of a diisocyanate and a monoamine or hydroxymonoamine having 1 to 5 aliphatic carbon atoms, the coating composition containing 0.1 to 30 percent by weight of the sag control agent.

The binder that can be thixotropized according to the invention may as a rule be any arbitrarily chosen binder. As suitable examples may be mentioned: ester diols, polyesters, polyurethanes, alkyd resins, which may or may not be modified with oil, acrylate resins or methacrylate resins, epoxy resins modified or not with oil, copolymers of a (meth)acrylate monomer, styrene and/or vinyl chloride, unsaturated polyester resins which may optionally be mixed with styrene and/or one or more other monomeric compounds, for instance, a (meth)acrylate monomer or an allyl compound, water-dilutable alkyd resins, water-dilutable polyesters or ester diols, water-dilutable polyurethanes, water-dilutable acrylate resins, drying or non-drying oils, stand oil and other synthetic or natural resins.

Any suitable diisocyanate may be used for the preparation of the sag control agent such as an aliphatic or araliphatic or cycloaliphatic or aromatic diisocyanate. The diisocyanate usually contains 3 to 40, and preferably 4 to 20 carbon atoms. It is preferred that use should be made of a symmetrical aliphatic or cycloaliphatic diisocyanate. As suitable examples of diisocyanates may be mentioned tetramethylene-1,4-diisocyanate, hexamethylene-1,6-diisocyanate, ω,ω'-dipropylether diisocyanate, thiodipropyl diisocyanate, cyclohexyl-1,4-diisocyanate, dicyclohexyl methane-4,4'-diisocyanate, 1,5-dimethyl(2,4-ω-diisocyanato methyl) benzene, 1,5-dimethyl(2,4-ω-diisocyanatoethyl)benzene, 1,3,5-trimethyl(2,4-ω-diisocyanatomethyl)benzene, 1,3,5-triethyl(2,4-ω-diisocyanatomethyl)benzene, the trimer of hexamethylene-1,6-diisocyanate (marketed by Farbenfabriken Bayer of West Germany under the trade name Desmodur N), isophoron diisocyanate, dicyclohexyldimethylmethane-4,4'-diisocyanate, 2,4-toluene diisocyanate, 2,6-toluene diisocyanate and diphenylmethane-4,4'-diisocyanate. Hexamethylene-1,6-diisocyanate, and an aromatic diisocyanate, for instance: toluene diisocyanate are preferred. The second component to be used in the preparation of the sag control agent according to the invention is a monoamine or hydroxymonoamine having 1 to 5 aliphatic carbon atoms. As suitable monoamines may be mentioned benzylamine, ethylamine, n-propylamine, sec.propylamine, n-butylamine, sec.-butylamine, tert.butylamine, n-pentylamine, α-methylbutylamine, α-ethylpropylamine, β-ethylbutylamine and γ-methylbutylamine. It is preferred that use should be made of monoamines having 1–4 aliphatic carbon atoms such as benzyl amine, propylamine and tert-.butylamine. Suitable hydroxymonoamines are monohydroxymonoamines such as 2-aminoethanol, 1-aminoethanol, 2-aminopropanol, 3-aminopropanol, 1-amino-2-propanol, 2-amino-2-methyl propanol, 2-aminobutanol, 5-aminopentanol, and polyhydroxymonoamines such as 2-amino-2-methyl-1,3-propane diol and 2-amino-2-ethyl-1,3-propane diol. It is preferred that 2-aminoethanol should be used. Alternatively, use may be made of mixtures of one or more monoamines and one or more monohydroxyamines and/or polyhydroxymonoamines.

The monoamines and the hydroxymonoamines are collectively referred to hereinafter as monoamines. In the reaction between the diisocyanate and the monoamine for the preparation of the sag control agent either the diisocyanate or the monoamine may generally by employed in excess relative to the stoichiometric amount. For example, the ratio of the number of amino groups of the monoamine to the number of isocyanate groups of the diisocyanate may be in the range of 0.7 to 1.5, which ratio, however, should preferably be in the order of 1.

The reaction between the diisocyanate and the monoamine may generally be carried out in any arbitrarily chosen way by combining the reaction components, optionally at elevated temperature. It is preferred that the reaction should be carried out in an atmosphere of an inert gas at temperatures in the range of 10° to 150° C., more particularly in the range of 20° to 80° C. Although in general the reaction components may be combined in any arbitrarily chosen manner, it is as a rule preferred that the diisocyanate should be added to the monoamine, which may be done in several steps, if desired. Generally, the reaction is carried out in the presence of an inert organic solvent, such as for example, acetone, methyl isobutyl ketone, benzene, toluene, xylene, or an aliphatic hydrocarbon such as petroleum ether, but the use of a solvent is optional.

The preparation of the sag control agent may optionally also be carried out in the presence of a binder. It is preferred then that a mixture of the binder and the diisocyanate should be mixed with a mixture of the binder and the monoamine. The mixing operation may be carried out in any convenient manner, with the reactants being vigorously stirred. In a preferred embodiment of this method the binder is mixed with such amounts of the diisocyanate and the monoamine that upon conclusion of the reaction there is obtained a mixture to be used as master batch of the sag control agent, consisting of 30–70% by weight of the sag control agent and 70–30% by weight of the binder.

More particularly, the mixture consists of 40–60% by weight of the sag control agent and 60–40% by weight of the binder. These weight ratios generally result in obtaining a powdered or crumbled mixture which can very readily be homogeneously mixed with the binder to be employed in the preparation of the thixotropic coating composition. The binders in the thixotropic coating composition and in the master batch of the sag control agents may be of the same or of different composition. Particularly, if the binder need be present in the master batch in only a small amount, the respective binders may chemically differ. Alternatively, the sag control agent may be added previously to one or more of the starting materials for the preparation of the binder. In this "in situ" preparation the reaction is preferably carried out in an atmosphere of inert gas at a temperature in the range of 20° to 80° C., in which case first the monoamine is added to the binder and, after the mixture has been homogenized, the diisocyanate is slowly added to the mixture, with stirring.

If the sag control agent is not prepared in situ in the binder, the two components of the thixotropic coating composition can be mixed by melting the sag control agent at a temperature in the range of 80° to 200° C. in the presence of the binder, as a result of which a homogeneous mixture is obtained. After the mixture has been cooled to room temperature, the sag control agent forms a dispersion in the binder and the resulting thixotropic coating composition may have an opaque, an opalescent or even a transparent appearance, depending on the size and the refractive index of the dispersed particles of the sag control agent.

The degree to which the coating composition is thixotropic, of course, depends on the proportion of sag control agent and the nature of the sag control agent and the binder. As a rule, the desired degree of thixotropy may be obtained by employing the sag control agent in an amount of 0.1 to 30 percent and preferably 0.5 to 10 percent by weight, based on the total amount of coating composition.

The thixotropic coating compositions according to the invention may contain polar and/or non-polar solvents without their thixotropic character being affected. Nor is the thixotropy affected at elevated temperature, so that the sag control agent according to the invention is very suitable for use in baking paints, which are usually cured at temperatures in the range of 80° to 250° C.

The sag control agents according to the invention are particularly suitable for use in coating compositions having a high solids content, because they seldom or not at all increase the viscosity of the coating composition, so that no solvent or only a very small amount thereof is needed to bring the coating composition in an applicable state. By a coating composition having a high solids content is to be understood here a composition having a solids content of at least 70 percent by weight. The solids content is determined in accordance with the ASTM Method D 1644-59 with heating for 1 hour at 105° C. The sag control agent according to the invention further has the considerable advantage that it does not or seldom decreases the gloss of the composition, particularly if the composition contains a pigment. This is in sharp contrast to the effect produced by other sag control agents such as aerosil and other silicates.

Depending on the binder employed, any conventional compound can be used as curing agent. The coating composition may further contain usual adjuvants and additives, for instance pigment dispersants, dyes, pigments, solvents and accelerators for the curing reaction, for instance acidic compounds such as p-toluene sulphonic acid or blocked products thereof.

The thixotropic coating compositions may be applied to a substrate in any desired manner, for instance by rolling, spraying, brushing, sprinkling, casting, dipping or electrostatic spraying.

The thixotropic coating composition may further be cured or baked in the usual way, for instance at ambient temperatures or in an oven at the usual temperatures, for instance in the range of 80° to 250° C., over a period of 2 to 120 minutes.

The viscosity values given in the examples were measured at 23° C. with the aid of a Ford cup No. 4 and are expressed in seconds.

EXAMPLE 1

(a) Preparation of a clear baking paint having a high solids content (comparative part).

The following components were homogeneously mixed:

| | |
|---|---|
| resin I | 770 g |
| hexamethoxymethyl melamine | 240 g |
| xylene | 350 g |
| 20%-solution of p-toluene sulphonic acid in isopropanol | 15 g |

The resin I is an ester diol prepared from 1 mole of neopentyl glycol, 1 mole of phthalic anhydride and 1 mole of a fatty acid glycidyl ester having the formula $C_{13}H_{24}O_3$ and an average molecular weight of 500 (available under the trade name Cardura E). The sprayable composition has a viscosity of 25 seconds.

(b) Preparation of a thixotropic clear baking paint having a high solids content.

The following components were homogeneously mixed:

| | |
|---|---|
| resin I (according to part a) | 770 g |
| hexamethoxymethyl melamine | 240 g |
| xylene | 490 g |
| propylamine | 14 g |

Over a period of 30 minutes 22 grams of hexamethylene-1,6-diisocyanate were added to this mixture, with stirring and under an atmosphere of nitrogen, the temperature of the reaction mixture rising from 25° to 32° C., after which stirring was continued for another 30 minutes. An opalescent, thixotropic composition was obtained to which 15 grams of a 20%-solution of p-toluene sulphonic acid in isopropanol was added. The resulting composition had a viscosity of 25 seconds.

The two baking paints (a) and (b) were applied to a metal panel (Bonder 120) and in a variable coating thickness in the wet state of 0 μm to 100 μm, after which they were cured in an oven for 30 minutes at 130° C. while placed in a vertical position. The baking paint (a) already displayed sagging with a coating thickness of the cured film of 15 μm, the greatest coating thickness being 25 μm. The baking paint (b), however, showed sagging with a coating as thick as 55 μm, the greatest coating thickness being 75 μm.

Consequently, to still obtain a homogeneous coating thickness the composition of the invention can be applied twice as thick as the composition prepared without a sag control agent. Moreover, the baking paint (b) when cured on a glass plate gave a perfectly transparent film.

EXAMPLE 2

(a) Preparation of a clear baking paint having a high solids content (comparative part)

The following components were homogeneously mixed:

| | |
|---|---|
| di(2,2,4-trimethyl-1,3-pentane diol) isophthalate | 417 g |
| di(2,2,4-trimethyl-1,3-pentane diol) adipate | 834 g |

-continued

| | |
|---|---|
| hexamethoxymethyl melamine | 500 g |
| mixture of equal parts by weight of xylene and ethyl glycol acetate | 390 g |
| 20% solution of p-toluene sulphonic acid in isopropanol | 26 g |

The sprayable composition had a viscosity of 25 seconds.

(b) Preparation of a thixotropic clear baking paint having a high solids content The following components were homogeneously mixed:

| | |
|---|---|
| di(2,2,4-trimethyl-1,3-pentane diol) isophthalate | 417 g |
| di(2,2,4-trimethyl-1,3-pentane diol) adipate | 834 g |
| hexamethoxymethyl melamine | 500 g |
| mixture of equal parts by weight of xylene and ethyl glycol acetate | 620 g |
| benzylamine | 37.5 g |

Over a period of 30 minutes 32.5 grams of hexamethylene-1,6-diisocyanate were added, with stirring and under an atmosphere of nitrogen, the temperature of the reaction mixture rising somewhat, after which the stirring was continued for another 30 minutes. An opalescent thixotropic resin was obtained to which 26 grams of a 20%-solution of p-toluene sulphonic acid in isopropanol were added. The sprayable composition had a viscosity of 25 seconds.

The baking paints (a) and (b) were applied and tested as indicated in Example 1. The coating paint (a) already displayed sagging with a coating thickness of the cured film of 15 μm, whereas in that case the coating thickness of the coating paint (b) was 60 μm.

When cured on a glass plate, the coating paint (b) gave a perfectly transparent film.

EXAMPLE 3

(a) Preparation of a clear baking paint having a high solids content (comparative experiment)

The following components were homogeneously mixed:

| | |
|---|---|
| di(neopentyl glycol) isophthalate | 600 g |
| di(neopentyl glycol) adipate | 600 g |
| hexamethoxymethyl melamine | 600 g |
| mixture of equal parts by weight of xylene and ethyl glycol acetate | 360 g |
| 20% - solution of p-toluene sulphonic acid in isopropanol | 27 g |

The sprayable composition had a viscosity of 25 seconds.

(b) Preparation of a thixotropic clear baking paint having a high solids content The following components were homogeneously mixed:

| | |
|---|---|
| di(neopentyl glycol) isophthalate | 600 g |
| di(neopentyl glycol) adipate | 600 g |
| hexamethoxymethyl melamine | 600 g |
| mixture of equal parts by weight of xylene and ethyl glycol acetate | 500 g |

-continued

| | |
|---|---|
| benzylamine | 13.2 g |

Over a period of 30 minutes there were still added, with stirring and under an atmosphere of nitrogen, 11 grams of an 80/20 mixture of 2,4- and 2,6- toluene diisocyanate, the temperature of the reaction mixture rising somewhat, after which stirring was continued for another 30 minutes. An opalescent thixotropic resin was obtained to which 27 grams of a 20%-solution of p-toluene sulphonic acid in isopropanol were added. The sprayable composition had a viscosity of 25 seconds.

The baking compositions (a) and (b) were applied and tested as indicated in Example 1. The baking paint (a) began displaying sagging with a coating thickness of the cured film of 15 μm, whereas in the case of the composition (b) this value was 50 μm. When cured on a glass plate, the baking paint (b) displayed a perfectly transparent film.

EXAMPLE 4

(a) Preparation of a pigment disperson

A pigment dispersion was prepared by grinding the following ingredients in a Red-devil shaking machine and subsequently filtering it off:

| | |
|---|---|
| titanium dioxide | 480 g |
| pigment dispersant (a polyester having a high molecular weight) | 30 g |
| hexamethoxymethyl melamine | 140 g |
| xylene | 60 g |

(b) Preparation of a thixotropic resin

The following components were homogeneously mixed:

| | |
|---|---|
| di(neopentyl glycol)isophthalate | 480 g |
| di(neopentyl glycol)adipate | 960 g |
| hexamethoxymethyl melamine | 180 g |
| mixture of equal parts by weight of xylene and ethyl glycol acetate | 430 g |
| benzylamine | 27.5 g |

To this mixture 23.75 grams of hexamethylene-1,6-diisocyanate were added in the same way as indicated in Example 2b, resulting in an opalescent thixotropic.

(c) Preparation of a sprayable pigmented thixotropic baking paint having a high solids content A pigmented baking paint was obtained by homogeneously mixing the following components:

| | |
|---|---|
| pigment dispersion (in accordance with part a) | 355 g |
| thixotropic resin (in accordance with part b) | 350 g |
| mixture of equal parts by weight of xylene and ethyl glycol acetate | 40 g |
| 20%-solution of p-toluene sulphonic acid in isopropanol | 15 g |
| The sprayable composition had a viscosity of 25 seconds. | |

(d) In a comparative experiment instead of 350 grams of the thixotropic resin 312 grams of the mixture of the following ingredients were used:

| | |
|---|---|
| di(neopentyl glycol)isophthalate | 480 g |
| di(neopentyl glycol)adipate | 960 g |
| hexamethoxymethyl melamine | 180 g |
| mixture of equal parts by weight of xylene and ethyl glycol acetate | 250 g |

This sprayable composition, too, had a viscosity of 25 seconds.

As compared with the paint based on the thixotropic resin (c) the paint with the non-thixotropic resin (d) shows a strong tendency in its wet state to run off a vertically positioned metal panel (Bonder 120) when applied to it in a thickness of 80 μm. After the vertical panels had been baked (30 minutes at 130° C.), the thixotropic paint was found to have the same coating thickness of 60 μm of the cured film at the top and the bottom of the panel, whereas on the other hand the non-thixotropic control paint showed a thickness at the top of 15 μm and of 25 μm at the bottom. Unlike the non-thixotropic paint, the thixotropic paint does not display any running off when being baked. The thixotropic paint moreover has a very good gloss.

EXAMPLE 5

(a) Preparation of a thixotropic clear baking paint having a high solids content The following components were homogeneously mixed:

| | |
|---|---|
| di(neopentyl glycol) isophthalate | 480 g |
| di(neopentyl glycol) adipate | 960 g |
| hexamethoxymethyl melamine | 180 g |
| mixture of equal parts by weight of xylene and ethyl glycol acetate | 430 g |
| benzylamine | 14.3 g |

Over a period of 30 minutes there were still added, with stirring and under an atmosphere of nitrogen, 11.7 grams of a 80/20 mixture of 2,4- and 2,6-toluene diisocyanate, the temperature of the reaction mixture rising somewhat, after which stirring was continued for another 30 minutes.

An opalescent thixotropic resin was obtained.

(b) Preparation of a sprayable thixotropic, pigmented baking paint having a high solids content The following components were homogeneously mixed:

| | |
|---|---|
| pigment dispersion (see Example 4a) | 355 g |
| thixotropic resin (see a) | 350 g |
| mixture of equal parts by weight of xylene and ethyl glycol acetate | 40 g |
| 20%-solution of p-toluene sulphonic acid in isopropanol | 15 g |

The sprayable composition had a viscosity of 25 seconds.

The baking compositions (a) and (b) were applied and tested in the same way as indicated in Example 1. The baking paint (a) began to display sagging with a coating thickness of the cured film of 20 μm, whereas in the case of the baking paint (b) this value was 75 μm. When cured on a glass plate, the baking paint (b) displayed a perfectly transparent film.

EXAMPLE 6

(a) Preparation of a sag control agent

To 2 moles (=122 grams) of 2-aminoethanol in 500 ml of acetone there was added dropwise and under an atmosphere of nitrogen 1 mole (=168 grams) of hexamethylene-1,6-diisocyanate, the reaction vessel being somewhat cooled to keep the temperature, which slightly rose as a result of reaction heat, at about 50° C.

After all the hexamethylene-1,6-diisocyanate had been added, heating was continued for 15 minutes with refluxing. After the product obtained had been cooled, it was filtered off and dried in vacuo. The product is a semi-crystalline compound having a melting point of about 180° C.

(b) Preparation of a thixotropic ester diol resin 650 grams of an ester diol mixture consisting of 45 percent by weight of di(1,2-propanediol)phthalate and 55 percent by weight of di(1,2-propanediol)adipate were mixed with 50 grams of the conversion product of (a) and heated, with stirring, to 150° C. in an atmosphere of nitrogen. At this temperature the mixture became homogeneous and clear. After cooling, an opalescent, strongly thixotropic ester diol resin was obtained.

(c) Preparation of a sprayable thixotropic baking paint having a high solids content The following components were homogeneously mixed:

| | |
|---|---|
| pigment dispersion (see Example 4a) | 355 g |
| hexamethoxymethyl melamine | 35 g |
| thixotropic ester diolresin (see b) | 230 g |
| mixture of equal parts by weight of xylene and ethyl glycol acetate | 80 g |
| 20%-solution of p-toluene sulphonic acid in isopropanol | 9 g |

In a comparative experiment instead of thixotropic ester diol 230 grams of the same ester diol were used, however without the sag control agent. The two paints were applied and tested in the way indicated in Example 1.

The thixotropic baking paint did not show sagging before the thickness of the cured film was 80 μm, whereas in the case of the non-thixogropic baking lacquer sagging was already found to occur with a thickness of 20 μm.

EXAMPLE 7

(a) Preparation of a thixotropic ester diol resin

To 650 grams of the ester diol mixture of Example 6 b 20 grams of 2-amino ethanol were added. Subsequently, 30 grams of hexamethylene-1,6-diisocyanate were added dropwise, with stirring, in an atmosphere of nitrogen, the temperature of the reaction mixture rising somewhat. After all the hexamethylene-1,6-diisocyanate had been added, heating was continued for 30 minutes at 50° C. Upon cooling an opalescent, strongly thixotropic ester diol resin was obtained.

(b) Preparation of a sprayable thixotropic baking paint

For the preparation of a sprayable thixotropic baking paint the procedure of Example 1c was used. The paint was sprayed onto vertical surfaces in amounts corresponding to a coating surface in the cured state of at least 80 μm without displaying any running off.

EXAMPLE 8

The procedure of Example 6 was repeated in such a way that use was made of a sprayable baking paint which contained as sag control agent the reaction product of 2 moles of 1-aminoethanol and 1 mole of hexamethylene-1,6-diisocyanate instead of the sag control agent of Example 6a. The reaction product was also prepared in acetone (see Example 4a) and is a semi-crystalline compound having a melting point of 186° C. In this way an opalescent thixotropic ester diol resin was obtained (analogous to the one obtained in Example 6b). The thixotropic baking paint (see Example 6c) was sprayed onto vertical surfaces in amounts corresponding to a coating thickness in the cured state of at least 80 μm without displaying any running off.

EXAMPLE 9

(a) Preparation of the thixotropic ester diol resin

Examples 6a and 6b were repeated, use being made of the reaction product of 2 moles of 5-aminopentanol and 1 mole of hexamethylene-1,6-diisocyanate instead of the sag control agent of Example 6a. As in Example 6a, the preparation of the sag control agent was carried out in acetone and a semi-crystalline compound having a melting point of 164° C. was formed. An opalescent, thixotropic ester diol resin was obtained (analogous to the one obtained in Example 6b).

(b) Preparation of a thixotropic baking paint

The following components were homogeneously intermixed in a Red-devil shaking machine:

| | |
|---|---|
| thixotropic ester diol resin (see a) | 245 g |
| hexamethoxymethyl melamine | 105 g |
| titanium dioxide | 240 g |
| mixture of equal parts by weight of xylene and ethyl glycol acetate | 90 g |
| 20%-solution of p-toluene sulphonic acid in isopropanol | 9 g |

The thixotropic baking paint was applied to vertical surfaces in amounts corresponding to a coating thickness in the cured state of at least 60 μm without displaying any running off.

EXAMPLE 10

The procedure of Example 9 was repeated in such a way that instead of the sag control agent of Example 9a the reaction product of 2 moles of 2-amino-2-methyl-1,3-propanediol and 1 mole of hexamethylene-1,6-diisocyanate was used.

The latter reaction product was prepared in dioxane and is a semi-crystalline compound having a melting point of 168° C. The product obtained was a clear thixotropic ester diol resin (analogous to the one obtained in Example 6b). The thixotropic baking paint was applied to vertical surfaces in amounts corresponding to a coating thickness in the cured state of at least 80 μm without running off.

EXAMPLE 11

Example 9 was repeated in such a way that in the preparation of the baking paint the sag control agent of Example 9a was replaced by the reaction product of 2 moles of 2-ethyl-2-amino-1,3-propanediol and 1 mole of hexamethylene-1,6-diisocyanate. The latter reaction product was prepared in acetone and is a semi-crystalline compound having a melting point of 125° C. In this way a clear thixotropic ester diol resin was obtained (analogous to the one obtained in Example 6b). The thixotropic baking paint can be applied to vertical surfaces up to amounts corresponding to a coating thickness in the cured state of at least 80 μm without showing any running off.

EXAMPLE 12

The procedure of Example 9 was repeated in such a way that in the preparation of the baking paint the reaction product of Example 9a was replaced by the reaction product of 2-aminoethanol and 1 mole of hexamethylene-1,6-diisocyanate trimer (trade mark Desmodur N). The latter reaction product was prepared as follows:

To 100 grams of Desmodur N (which contained about 25% by weight of a mixture of equal parts by weight of xylene and ethyl glycol acetate and NCO-groups in an amount of 3.9 meq. per gram) there were rapidly added, with stirring and in an atmosphere of nitrogen, 23 grams of 2-aminoethanol, the reaction mixture being so cooled that its temperature did not exceed 40° C. At conclusion of the reaction a clear thixotropic resin was obtained. Subsequently, 50 grams of this resin were added to 650 grams of the diester diol mixture of Example 6b and a clear thixotropic ester diol resin was obtained. The thixotropic baking paint prepared with it was applied to vertical surfaces in amounts corresponding to a coating thickness in the baked state of at least 80 μm without displaying any running off.

EXAMPLE 13

Example 9 was repeated in such a way that in the preparation of the baking paint the reaction product of Example 9a was replaced by the reaction product of 2 moles of 2-aminoethanol and 1 mole of dicyclohexyl dimethyl methane-4,4'-diisocyanate. The latter reaction product was prepared in acetone and is a semi-crystalline compound having a melting point of 155° C. The product obtained was a clear thixotropic ester diol resin (analogous to the one obtained in Example 7a). The thixotropic baking paint was applied to vertical surfaces in amounts corresponding to a coating thickness in the cured state of at least 80 μm without showing any signs of running off.

EXAMPLE 14

Example 7 was repeated in such a way that in the preparation of the baking paint the reaction product of Example 7a was replaced by the reaction product of 2 moles of 5-aminopentanol and 1 mole of cyclohexyl-1,4-diisocyanate. The product obtained was an opalescent thixotropic ester diol resin (analogous to the resin obtained in Example 7a).

The thixotropic baking paint (see Example 7b) can be applied to vertical surfaces in amounts corresponding to a coating thickness in the cured state of at least 80 μm without showing any signs of running off.

EXAMPLE 15

(a) Preparation of a thixotropic ester resin

Example 6b was repeated in such a way that in the preparation of the thixotropic ester diol resin instead of 650 grams of the ester diol mixture of Example 6b 720 grams of a mixture of equal parts by weight of di(1,2-propanediol)phthalate and di(1,2-propanediol)adipate were used and instead of 50 grams of the reaction product of Example 6a, 21 grams of the reaction product of 2 moles of tert.butylamine and 1 mole of hexamethylene-1,6-diisocyanate.

(b) Preparation of a water-dilutable thixotropic baking paint

The following components were homogeneously mixed:

| | |
|---|---|
| thixotropic ester diol resin (see a) | 247 g |
| hexamethoxymethyl melamine | 105 g |
| titanium dioxide | 240 g |
| silicone resin | 1.5 g |
| water | 80 g |
| p-toluene sulphonic acid | 5 g |

The thixotropic baking paint was applied to vertical surfaces up to amounts corresponding to a coating thickness in the cured state of at least 55 μm without displaying any running off.

EXAMPLE 16

To 1000 grams of a water-dilutable resin consisting of a polyether resin, a melamine resin as curing agent, and titanium dioxide as pigment, 10 grams of 2-aminoethanol were added.

Subsequently, 15 grams of hexamethylene-1,6-diisocyanate were added dropwise. After all the hexamethylene-1,6-diisocyanate had been added, stirring was continued for 30 minutes. A thixotropic lacquer was obtained.

EXAMPLE 17

To 2000 grams of a conventional alkyd/melamine motorcar paint there were added 11 grams of benzylamine. Subsequently, 9.5 grams of hexamethylene-1,6-diisocyanate were added dropwise. After all the hexamethylene-1,6-diisocyanate had been added, stirring was continued for 30 minutes and a thixotropic paint was formed.

EXAMPLE 18

For the preparation of a metallized coating composition 125 grams of an aluminium pigment paste containing 60% by weight of pure aluminium (marketed under the trade name Silberlein 588), 125 grams of xylene and 2500 grams of the thixotropic baking paint of Example 2b were homogeneously mixed. The thixotropic composition was applied to a substrate and tested in the same manner as indicated in Example 1.

The thixotropic metallized coating composition was sprayed onto vertical surfaces in amounts corresponding to a coating thickness in the cured state of 60 μm without displaying any running off.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A thixotropic coating composition containing a binder and 0.1 to 30% by weight of a reaction product of an organic diisocyanate and benzylamine as a sag control agent.

2. The coating composition of claim 1, characterized in that the diisocyanate from which the sag control agent is prepared is a symmetrical aliphatic or cycloaliphatic diisocyanate.

3. The coating composition of claim 1, characterized in that the diisocyanate is hexamethylene-1,6-diisocyanate.

4. The coating composition of claim 1, characterized in that the diisocyanate used in the preparation of the sag control agent is an aromatic diisocyanate.

5. The coating composition of claim 4, characterized in that the diisocyanate is toluene diisocyanate.

6. The coating composition of claim 1, characterized in that in the reaction mixture for the preparation of the sag control agent the ratio of the number of amino groups of the benzylamine to the number of isocyanate groups of the diisocyanate is in the range of 0.7 to 1.5.

7. A process for the preparation of a sag control agent for a coating which comprises reacting an organic diisocyanate and benzylamine in the presence of a binder in such a manner that the resulting mixture consists of 30–70% by weight of the sag control agent and 70–30% by weight of a binder.

8. The process of claim 7 wherein a mixture made up of 40–60% by weight of the sag control agent and 60–40% by weight of the binder is prepared.

9. A mixture obtained by the process of claim 7.

10. A method for preventing sagging of a thixotropic coating composition having a solids content of at least 70% by weight without substantially decreasing the gloss of the coating which comprises mixing with the said coating composition from 0.1 to 20 percent by weight based on the weight of said composition of a reaction product of and benzylamine an organic diisocyanate, with the ratio of amino groups to isocyanate groups being 0.7 to 1.5 amine groups per isocyanate group.

* * * * *